(12) United States Patent
Xiao

(10) Patent No.: US 9,176,941 B2
(45) Date of Patent: Nov. 3, 2015

(54) TEXT INPUTTING METHOD, APPARATUS AND SYSTEM BASED ON A CACHE-BASED LANGUAGE MODEL AND A UNIVERSAL LANGUAGE MODEL

(75) Inventor: Jinghui Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/232,737

(22) PCT Filed: Jul. 13, 2012

(86) PCT No.: PCT/CN2012/078591
§ 371 (c)(1),
(2), (4) Date: Jan. 14, 2014

(87) PCT Pub. No.: WO2013/007210
PCT Pub. Date: Jan. 17, 2013

(65) Prior Publication Data
US 2014/0136970 A1    May 15, 2014

(30) Foreign Application Priority Data

Jul. 14, 2011   (CN) .......................... 2011 1 0197062
Jul. 25, 2011   (CN) .......................... 2011 1 0209014

(51) Int. Cl.
*G06F 17/20*    (2006.01)
*G06F 17/24*    (2006.01)
*G06F 17/28*    (2006.01)
(Continued)

(52) U.S. Cl.
CPC .............. *G06F 17/24* (2013.01); *G06F 3/0237* (2013.01); *G06F 17/2223* (2013.01); *G06F 17/276* (2013.01); *G06F 17/28* (2013.01)

(58) Field of Classification Search
CPC ..... G06F 17/24; G06F 17/214; G06F 17/289; G06F 17/211; G06F 17/241; G06F 17/276; G06F 17/2223; G06F 17/0237

USPC .................................. 715/264, 265, 256, 703
See application file for complete search history.

(56) References Cited

U.S. PATENT DOCUMENTS

| | | | |
|---|---|---|---|
| 7,103,534 B2 * | 9/2006 | Goodman | 704/9 |
| 8,260,615 B1 * | 9/2012 | Nakajima et al. | 704/257 |

(Continued)

FOREIGN PATENT DOCUMENTS

| | | |
|---|---|---|
| CN | 1447264 A | 10/2003 |
| CN | 101131706 A | 2/2008 |
| CN | 101206673 A | 6/2008 |

OTHER PUBLICATIONS

Written Opinion of the International Searching Authority (in English and Chinese) for PCT/CN2012/078591, mailed Oct. 4, 2012; ISA/CN.

(Continued)

*Primary Examiner* — Scott Baderman
*Assistant Examiner* — Hassan Mrabi
(74) *Attorney, Agent, or Firm* — Anova Law Group, PLLC

(57) ABSTRACT

A text inputting method includes: obtaining a user identifier, finding a user language module corresponding to the user identifier according to the user identifier; obtaining a user input, generating a candidate sentence list according to the user input; obtaining a universal language model, calculating an on-screen probability of each candidate sentence in the candidate sentence list according to the user language model and the universal language model; sorting candidate sentences in the candidate sentence list according to their on-screen probabilities; and outputting the sorted candidate sentence list. The method increases a text inputting accuracy ratio and an inputting speed. In addition, a text inputting system and an apparatus are also provided.

18 Claims, 6 Drawing Sheets

(51) Int. Cl.
*G06F 17/27* (2006.01)
*G06F 17/22* (2006.01)
*G06F 3/023* (2006.01)

(56) References Cited

U.S. PATENT DOCUMENTS 8,706,643 B1 * 4/2014 Jesensky et al. ............. 705/74

2002/0111806 A1 * 8/2002 Franz et al. .................. 704/255
2009/0055168 A1 * 2/2009 Wu et al. ....................... 704/10
2012/0297294 A1 * 11/2012 Scott et al. .................. 715/261

OTHER PUBLICATIONS

International Search Report (in English and Chinese) for PCT/CN2012/078591, mailed Oct. 4, 2012; ISA/CN.

* cited by examiner

TEXT INPUTTING METHOD, APPARATUS AND SYSTEM BASED ON A CACHE-BASED LANGUAGE MODEL AND A UNIVERSAL LANGUAGE MODEL

CROSS-REFERENCE TO RELATED APPLICATIONS

This application is a U.S. National Stage of International Application No. PCT/CN2012/078591, filed on Jul. 13, 2012 and published in Chinese as WO 2013/007210 on Jan. 17, 2013. This application claims the benefit of Chinese Application Nos. 201110197062.2, filed on Jul. 14, 2011 and 201110209014.0, filed on Jul. 25, 2011. The disclosures of the above applications are incorporated herein by reference.

FIELD OF THE DISCLOSURE

The present disclosure relates to text inputting techniques, and more particularly, to a text inputting method, apparatus and system.

BACKGROUND OF THE DISCLOSURE

Input method software is a kind of frequently used word inputting system.

A traditional text inputting method usually uses a universal language model as a core to construct the input method. The universal language model is obtained through analyzing a large amount of training material. The training material is usually obtained automatically from the Internet. It represents general an input requirement of most users, i.e., the universal language model is created based on common word-selection habits of most users. However, when inputting words using the input method software, a user usually wants to obtain characters that he constantly uses rapidly. When selecting a word, different users may desire different kinds of candidate sentences ranking in the first according to their different identities, interests and habits, and field of characters that they used to use. For example, a scientific researcher and a bank clerk usually hope that professional terms in their fields are ranked in the first when inputting words. For another example, people from north-east and Sichuan province also hope their own dialect words ranking in the first in the candidate sentence list. The traditional input method which uses the universal language model cannot meet the input requirement of different users. Thus, the input accuracy ratio is low and the input speed of the user is affected.

In addition, a standard Ngram language model modeling method has a defect. On the one hand, the standard Ngram language model is a simplex model. However, in a practical application, the user's Chinese input, handwritten recognizing, voice recognizing requirement are various and unlimited. For example, users may have variable and unlimited requirements such as Chinese input, handwriting recognizing and voice recognizing. For example, a user may write a technical report sometimes and chat on the Internet at other times. Under these two situations, Chinese input requirements of the user are different. For another example, users in different ages may have different speaking habits due to their different living experiences. Reflected on the Chinese input, contents constantly inputted by these users have a big difference. Therefore, a simplex model cannot meet different requirements for inputting Chinese of users of different ages and requirements of one user under different situations. For the different requirements, if the same model is adopted, accuracy of recognizing the input of the user is affected. On the other hand, the standard Ngram language model does not have a self-study mechanism. Once parameters in the standard Ngram language model are determined, the parameters cannot be adjusted intelligently according to inputting habits of the user. Thus, accuracy ratio for recognizing the input of the user is relatively low.

SUMMARY OF THE DISCLOSURE

An example of the present disclosure provides a text inputting method, so as to increase an inputting speed.

An example of the present disclosure provides a text input apparatus, so as to increase an accuracy ratio for recognizing inputted text.

An example of the present disclosure provides a text inputting system, so as to increase an input speed.

According to an example, a text inputting method includes:

obtaining a user identifier, finding a user language module corresponding to the user identifier according to the user identifier; obtaining a user input, generating a candidate sentence list according to the user input; obtaining a universal language model, calculating an on-screen probability of each candidate sentence in the candidate sentence list according to the user language model and the universal language model; or respectively calculating a standard conditional probability of each word in a user input according to a universal language model; respectively calculating a cache conditional probability of each word in the user input according to a preconfigured cache-based language modeling policy, the user input and a pre-cached user input; calculating a mixed conditional probability of each word according to the standard conditional probability and the cache conditional probability, and obtaining an on-screen probability of each candidate sentence according to the mixed conditional probability;

sorting candidate sentences in the candidate sentence list according to their on-screen probabilities; and outputting the sorted candidate sentence list.

According to another example, a text inputting method includes:

obtaining, by a client, a user identifier, finding a user language model corresponding to the user identifier according to the user identifier;

obtaining, by the client, a user input, uploading the user input to a server which generates a candidate sentence list according to the user input;

obtaining, by the server, a universal language model, calculating an on-screen probability of each candidate sentence in the candidate sentence list according to the user language model and the universal language model;

sorting, by the server, the candidate sentences in the candidate sentence list according to their on-screen probabilities and issuing the sorted candidate sentence list to the client; and receiving, by the client, the sorted candidate sentence list and outputting the sorted candidate sentence list.

According to still another example, a text inputting method includes:

obtaining, by a client, a user identifier, finding a user language model corresponding to the user identifier according to the user identifier;

obtaining, by the client, a user input, and generating a candidate sentence list according to the user input;

obtaining, by the client, a universal language model, calculating an on-screen probability of each candidate sentence in the candidate sentence list according to the user language model and the universal language model; and sorting, by the client, the candidate sentences in the candidate sentence list according to their on-screen probabilities, and outputting the sorted candidate sentence list.

According to an example, a text inputting system includes:

a searching module, to obtain a user identifier and find a user language model corresponding to the user identifier according to the user identifier;

a candidate sentence list generating module, to obtain a user input and generate a candidate sentence list according to the user input;

a probability calculating module, to calculate on-screen probability of each candidate sentence in the candidate sentence list according to the user language model and a universal language model;

a sorting module, to sort the candidate sentences in the candidate sentence list according to their on-screen probabilities; and an outputting module, to output the sorted candidate sentence list.

According to an example, a text processing system includes:

a client and a server; wherein the client is to obtain a user identifier and find a user language model corresponding to the user identifier according to the user identifier, obtain a user input, upload the user input to the server, receive a sorted candidate sentence list from the server and output the sorted candidate sentence list;

the server is to generate a candidate sentence list according to the user input, obtain a universal language model, calculate an on-screen probability of each candidate sentence in the candidate sentence list according to the user language model and the universal language model, sort the candidate sentences in the candidate sentence list according to their on-screen probabilities, and issue the sorted candidate sentence list to the client.

According to an example, a text processing apparatus includes:

a universal language model module, a cache module, a cache-based language modeling module and a mixed model module; wherein the universal language model module is to receive a user input, calculate a standard conditional probability of each word in the user input respectively and output the standard conditional probability to the mixed model module;

the cache module is to cache the sentence outputted by the mixed model module;

the cache-based language modeling module is to respectively calculate a cache conditional probability of each word in the user input according to a preconfigured cache-based language modeling policy, the user input and the sentences cached in the cache module, and output the cache conditional probability to the mixed model module;

the mixed model module is to calculate a mixed conditional probability of each word according to the standard conditional probability and the cache conditional probability, calculate a sentence probability of each output sentence according to the mixed conditional probability, select an output sentence with the largest sentence probability and output the sentence with the largest sentence probability.

The above text inputting method, apparatus and system combines the user language model and the universal language model. Since the user language is obtained through training according to user inputs, the sorted candidate sentence ranking in the first in the candidate sentence list conforms to the user's speaking habits better. Thus, the user is able to obtain a required candidate sentence more rapidly. The accuracy ratio for inputting text is increased and the inputting speed is also increased.

BRIEF DESCRIPTION OF THE DRAWINGS

Drawings used in the description of the background or the detailed description of the present disclosure are briefly introduced hereinafter to make the technical solution in the background or the examples of the present disclosure clearer. The following drawings are merely some examples. Those with ordinary skill in the art would obtain other drawings according to the following without an inventive work.

DETAILED DESCRIPTION OF THE DISCLOSURE

Figure 1:
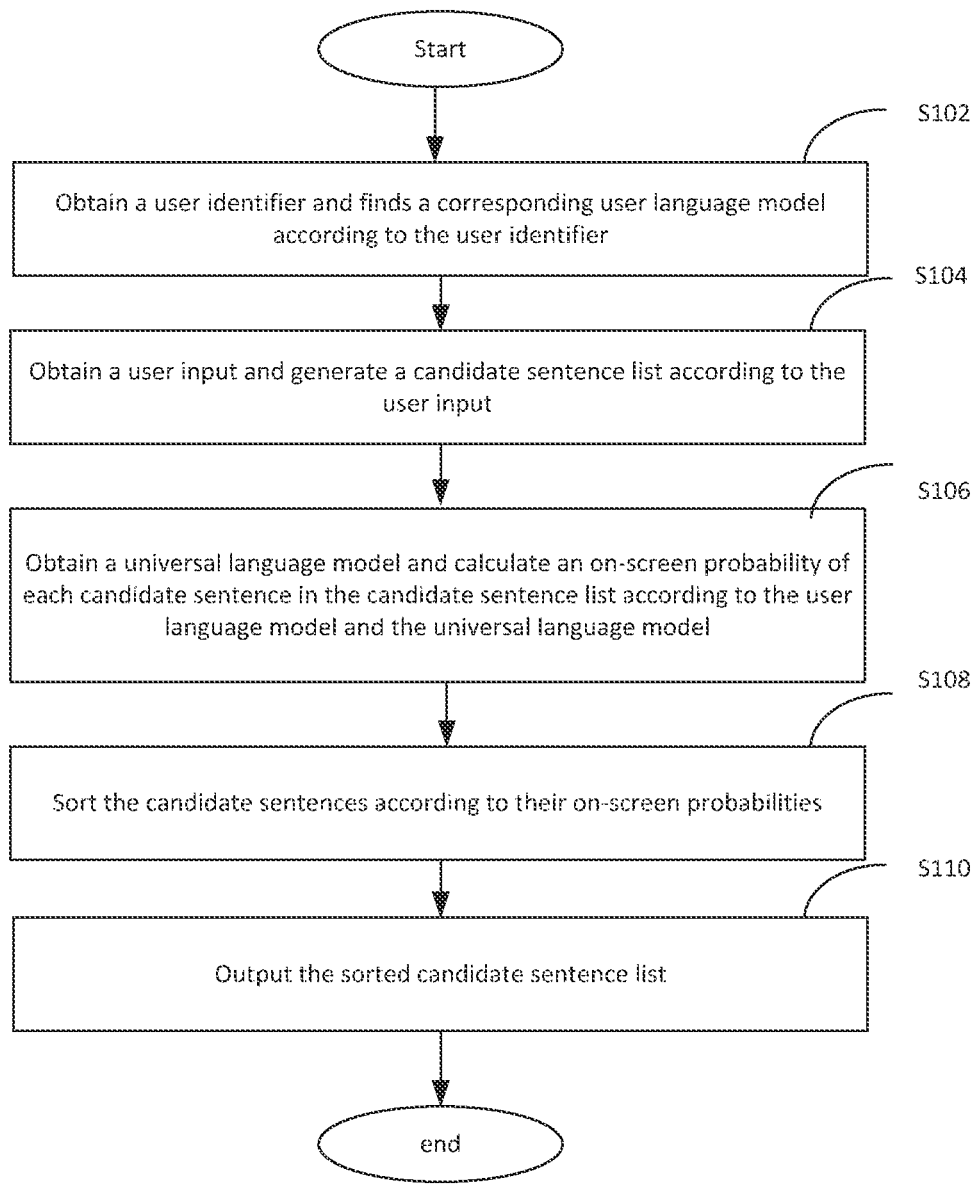
FIG. 1 is a flowchart illustrating a text inputting method according to an example of the present disclosure.

In one example, as shown in FIG. 1, a text inputting method includes the following.

At block S102, a user identifier is obtained and a user language model corresponding to the user identifier is obtained.

The user identifier identifies a user uniquely. It may be an account registered by the user in input method software, or an identification number assigned for the user, or an IP address, MAC address associated with a device used by the user.

In one example, before block S102, it is required to create the user language model corresponding to the user identifier. Each time the user inputs a word, the user language model is updated according to information of the word inputted by the user. Since the user language model is trained according to words inputted by the user, it conforms to language habits of the user. After the user language model is obtained by training, the user language model may be stored in a local storage of the user or uploaded to a server for storage.

At block S104, an input of the user is obtained, a candidate sentence list is generated according to the input of the user.

The input of the user may be a speech input, handwritten characters, optical characters or strings. A conventional text inputting method may be adopted to find a candidate sentence that matches the input of the user to generate the candidate sentence list.

At block S106, a universal language model is obtained, an on-screen probability of each candidate sentence in the candidate sentence list is calculated according to the user language model and the universal language model.

The universal language model may be a conventional statistical language model which is obtained through statistical analysis of a large amount of training material obtained from, e.g., sentences inputted by a lot of users on the Internet. The user language model corresponds to the user himself. User language models corresponding to different users may be different. The universal language model may be stored in the server or in a user device.

The user language model is obtained through training according to the inputs of the user. It should be noted that, during a first input using the input method software, since the user language model has not been updated, the on-screen probability of each candidate sentence in the candidate sentence list may be calculated according to the universal language model. The method and principle are similar to those of conventional input method using the universal language model and is not described herein.

Each time the user inputs text using the input method software, words inputted by the user are recorded. The user language model is updated according to information of the words inputted by the user. The user language model is stored in association with the user identifier. When next time a word is inputted, the on-screen probability of each candidate sentence in the candidate work list can be calculated according to both the user language model and the universal language model.

In one example, both the universal language model and the user language model are stored in the user device. Thus, the universal language model and the user language module are obtained from a local storage of the user device to calculate the on-screen probability of each candidate sentence in the candidate sentence list. In this method, the user device does not need to transmit a request to a server. This manner is referred to as a local input method.

In another example, the universal language model and the user language model are stored in the server which obtains the universal language model and the user language model to calculate the on-screen probability of each candidate sentence in the candidate sentence list. In this manner, processing of the input method is implemented by the server. This manner is referred to a cloud input method.

At block S108, the candidate sentences in the candidate sentence list are sorted according to their on-screen probabilities.

In this example, the candidate sentences in the candidate sentence list are sorted in an ascending order according to their on-screen probabilities. Top-ranked words conform to the user's language habit better and may be desired by the user. Thus, the user may find a required candidate sentence more rapidly, which increase a text input accuracy and a text input speed.

At block S110, the sorted candidate sentence list is outputted.

The user may select a required candidate sentence from the candidate sentence list. The selected candidate sentence is outputted from the input method software to various kinds of application programs, e.g., text document, notebook, presentation document, etc.

In one example, block S110 includes: a candidate sentence with a largest on-screen probability is outputted. The candidate sentence with the largest on-screen probability is ranked in the first of an output list. The user is able to select the candidate sentence with the largest on-screen probability rapidly.

In another example, block S110 includes: a first candidate sentence with a largest on-screen probability obtained through the local input method is outputted, and a second candidate sentence with a largest on-screen probability obtained through the cloud input method is also outputted. The first candidate sentence and the second candidate sentence are outputted to an output list. The first candidate sentence ranks first and the second candidate sentence follows the first candidate sentence. Thus, the user is able to rapidly select any one of the candidate sentences having the largest on-screen probability obtained through the above two input methods.

In one example, the above text inputting method further includes: creating the user language model corresponding to the user identifier and updating, after the user inputs a word, the user language model according to information of the word inputted by the user. In particular, a user word library corresponding to the user identifier is created. Each time the user inputs a word, word information and frequency information of the word inputted by the user are added into the word library. When the user language model is updated, the word information and the frequency information are obtained from the word library. The word is divided and a word frequency processing operation is performed to the divided word. The user language model is updated according to the divided word and the processed word frequency. The word frequency denotes a number of times that the word emerges in the user library.

In one example, the same language model may be adopted for the user language model and the universal language model, e.g., an Ngram language model may be adopted. But training sets of the user language model and the universal language model are different. The training set of the user language model is a set of all words in the user library which corresponds to a unique user. The training set of the universal language model is a set of words inputted by a large amount of users. It may be obtained from the Internet.

A probability calculation formula of the user language model may be as follows:

$$P_{user}(S) = \prod_{i=1}^{m} P_{user}(w_i | w_{i-n+1} \ldots w_{i-1}),$$

wherein $P_{user}(S)$ denotes a probability of a sentence $S = w_1 w_2 \ldots w_m$ which includes m words. The sentence S includes words $w_1 w_2 \ldots w_m$, wherein $w_i$ is a word in sentence S which includes m words. For example, a sentence "have you eat today" may be divided into "have/you/eat/today". A maximum likelihood method may be used to calculate a probability statistics of $P_{user}(w_i | w_{i-n+1} \ldots w_{i-1})$ A calculation formula may be as shown in following:

$$p(w_i | w_{i-n+1} \ldots w_{i-1}) = \frac{c(w_{i-n+1} \ldots w_{i-1} w_i)}{c(w_{i-n+1} \ldots w_{i-1})},$$

wherein $c(w_{i-n+1} \ldots w_{i-1} w_i)$ denotes a number of times that the word sequence $w_{i-n+1} \ldots w_{i-1} w_i$ emerges in the training set, $c(w_{i-n+1} \ldots w_{i-1})$ denotes a number of times that the word sequence emerges in the training set. The training set is a set of all word sequences in the user word library.

In one example, the user language model may adopt a lower-grade language model, e.g., a Unigram language model. Compared with the Ngram language model, this language model occupies less storage space and is fit for use on mobile terminals. In this example, a probability calculation formula of the user language model is as follows:

$$P_{user}(S) = \prod_{i=1}^{m} P_{user}(w_i),$$

wherein $P_{user}(S)$ denotes a probability of sentence $S=w_1 w_2 \ldots w_m$ which includes m words.

In another example of the present disclosure, the user language model may use a Bigram language model. Compared with the above two language models, this language model has higher model-creating speed and is fit for use in the cloud input method.

In this example, a probability calculating formula used for the language model is as follows:

$$P_{user}(S) = \prod_{i=1}^{m} P_{user}(w_i \mid w_{i-1}),$$

wherein $P_{user}(S)$ denotes a probability of a sentence $S=w_1 w_2 \ldots w_n$ including m words; $P_{user}(w_i|w_{i-1})$ denotes that sentence S is divided into two words $w_i$ and $w_{i-1}$, a calculation formula of $P_{user}(w_i|w_{i-1})$ is as follows:

$$p(w_i \mid w_{i-1}) = \frac{c(w_{i-1} w_i)}{c(w_{i-1})},$$

wherein $c(w_{i-1} w_i)$ denotes the number of times that sentence S emerges in the training set, $c(w_{i-1})$ denotes the number of times that word $w_{i-1}$ emerges in the training set.

In one example, the process of calculating the on-screen probability of each candidate sentence in the candidate sentence list according to the user language model and the universal language model includes: perform a linear interpolation operation to the user language model and the universal language model to generate a mixed model, and calculate the on-screen probability of each candidate sentence in the candidate sentence list according to the mixed model.

In this example, the universal language model may be the conventional Ngram language model. Thus, a conditional probability of the user language model is combined with that of the universal language model. A mixed conditional probability is calculated. The calculation formula may be as follows:

$$P_{mixture}(w_i|w_{i-n+1} \ldots w_{i-1}) = a \times P(w_i|w_{i-n+1} \ldots w_{i-1}) + (1-a) \times P_{user}(w_i|w_{i-n+1} \ldots w_{i-1}),$$

wherein $P_{mixture}(w_i|w_{i-n+1} \ldots w_{i-1})$ denotes the mixed conditional probability, $P(w_i|w_{i-n+1} \ldots w_{i-1})$ denotes the conditional probability of the universal language model, $P_{user}(w_i|w_{i-n+1} \ldots w_{i-1})$ denotes the conditional probability of the user language model, a denotes an interpolation parameter with a value between 0 and 1.

According to the mixed conditional probability, the generated mixed model is as follows:

$$P(S) = \prod_{i=1}^{m} P_{mixture}(w_i \mid w_{i-n+1} \ldots w_{i-1}),$$

wherein $P(S)$ denotes a probability of sentence $S=w_1 w_2 \ldots w_m$ including m words.

The on-screen probability of the candidate sentence in the candidate sentence list is a probability that the candidate sentence is selected by the user calculated by the mixed model. The greater the on-screen probability, the more forward position that the candidate sentence is ranked in the candidate sentence list. Thus, the user can find a required word more rapidly. The text input speed is increased.

Figure 2:
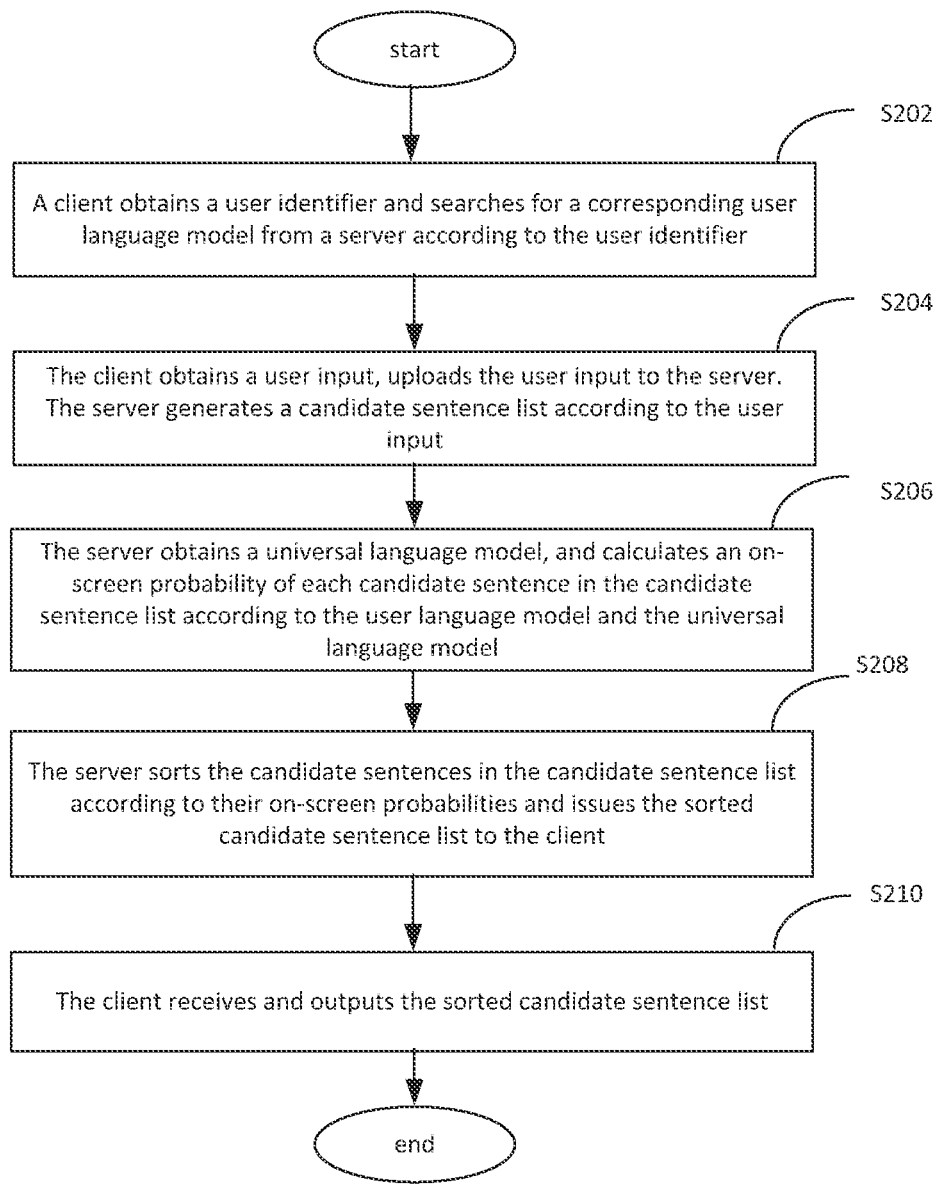
FIG. 2 is a flowchart illustrating a text inputting method according to another example of the present disclosure.

In one example, as shown in FIG. 2, a text inputting method includes the following.

At block S202, a client obtains a user identifier and finds a user language model corresponding to the user identifier from a server.

The user identifier identifies the user uniquely. It may be an account registered by the user in the input method software, or an identification number assigned for the user, or an IP address or MAC address associated with a device of the user. After an identity authentication, the user logs in the input method software. The client obtains the user identifier and transmits the user identifier to the server which finds the corresponding user language model.

In one example, a user language model corresponding to the user identifier is created in the server in advance. Each time the user inputs a word, the server obtains information of the word inputted by the user and updates the user language model according to the information of the word inputted by the user. Since the user language model corresponding to the user identifier is stored in the server, the user language model in the server can be updated continuously along with the input of the user. Therefore, the user language model in the server may become more and more accurate. When the user uses the input method software on different devices, the server issues the newest user language model to the user device. Thus, synchronization of the user language model is realized and it is fit for different user devices.

At block S204, the client obtains an input of the user and transmits the input to the server. The server generates a candidate sentence list according to the input of the user.

The input of the user may be a speech input, handwritten characters, or optical characters or strings. The client transmits the user input to the server. The server finds candidate sentences that match the user input from a word library according to a conventional text inputting method to generate a candidate sentence list. The processing of the text inputting method is implemented by the server. This kind of text inputting method is referred to as "cloud input method".

At block S206, the server obtains a universal language model, calculates an on-screen probability of each candidate sentence in the candidate sentence list according to the user language model and the universal language model.

The universal language model may be a conventional statistical language model obtained through training using a large amount of material obtained from texts inputted by a large number of users on the Internet. The user language model is corresponding to a unique user. Different users correspond to different user language models.

The user language model is obtained through training according to the inputs of the user. It should be noted that, during a first input using the input method software, since the user language model has not been updated, the on-screen probability of each candidate sentence in the candidate sentence list may be calculated according to the universal language model. The method and principle are similar to those of conventional input method using the universal language model and is not described herein.

Each time the user inputs a word using the input method software, the word inputted by the user is recorded. The language model is updated according to the word inputted by the user. The user language model is stored in association with the user identifier. When next time a word is inputted, the on-screen probability of each candidate sentence in the candidate work list can be calculated according to both the user language model and the universal language model.

In one example, the above text inputting method further includes: creating the user language model corresponding to the user identifier and updating, after the user inputs a word, the user language model according to information of the word inputted by the user. In particular, a user word library corresponding to the user identifier is created. Each time the user inputs a word, word information and frequency information of the word inputted by the user are added into the word library. When the user language model is updated, the word information and the frequency information are obtained from the word library. The word is divided and a word frequency processing operation is performed to the divided word. The user language model is updated according to the divided word and the processed word frequency. The word frequency denotes a number of times that the word emerges in the user library.

In one example, the user language model may be a Bigram language model. The creation of the model has been described above and is not repeated herein.

In one example, the process of calculating the on-screen probability of each candidate sentence in the candidate sentence list according to the user language model and the universal language model includes: perform a linear interpolation operation to the user language model and the universal language model to generate a mixed model, and calculate the on-screen probability of each candidate sentence in the candidate sentence list according to the mixed model.

The on-screen probability of the candidate sentence in the candidate sentence list is a probability that the candidate sentence may be selected by the user calculated by the mixed model. The greater the on-screen probability, the more forward position that the candidate sentence is ranked in the candidate sentence list. Thus, the user can find a required word more rapidly. The text inputting speed is increased.

At block S208, the server sorts the candidate sentences in the candidate sentence list according to their on-screen probabilities and transmits the sorted candidate sentence list to the user device.

At block S210, the user device receives and outputs the sorted candidate sentence list. The user may select a required word from the candidate sentence list. The selected candidate sentence is outputted from the input method software to an application program, e.g., a text document, a notebook, a presentation document, etc.

In one example, a text inputting method is provided.

Figure 3:
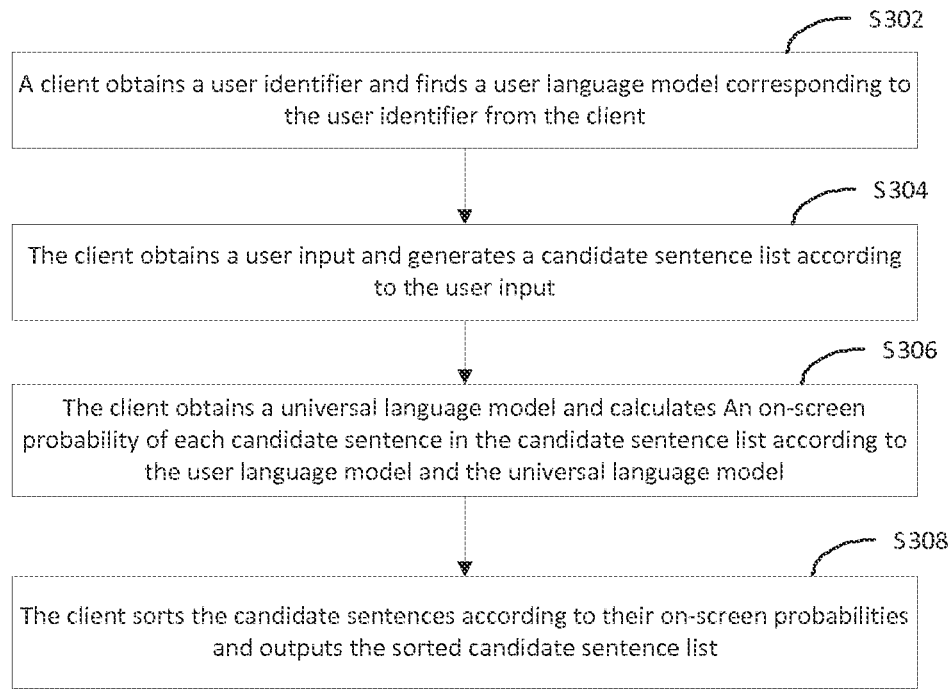
FIG. 3 is a flowchart illustrating a text inputting method according to still another example of the present disclosure.

FIG. 3 is a flowchart illustrating a text inputting method according to an example of the present disclosure. As shown in FIG. 3, the method includes the following.

At block S302, a client obtains a user identifier and finds a corresponding user language model in the user device according to the user identifier.

The user identifier identifies the user uniquely. It may be an account registered by the user in the input method software, or an identifier number assigned for the user, or an IP address or MAC address associated with a device of the user. After an identity authentication, the user logs in the input method software. The client obtains the user identifier and transmits the user identifier to the server which finds the corresponding user language model.

At block S304, the user device obtains a user input and generates a candidate sentence list according to the user input.

The user input may be a speech input, handwritten characters, optical characters or strings. The universal language model and the user language model are both stored in the user device. The user language model and the universal language model may be obtained directly from the user device to calculate the on-screen probability of each candidate sentence in the candidate sentence list. In this example, the user device does not need to transmit a request to the server. This method is also referred to as "local input method".

At block S306, the user device obtains the universal language model from itself and calculates the on-screen probability of each candidate sentence in the candidate sentence list according to the user language model and the universal language model.

The universal language model may be a conventional statistical language model obtained through training using a large amount of material obtained from texts inputted by a large number of users on the Internet. The user language model is corresponding to a unique user. Different users correspond to different user language models.

The user language model is obtained through training according to the inputs of the user. It should be noted that, during the first time input using the input method software, since the user language model has not been updated, the on-screen probability of each candidate sentence in the candidate sentence list may be calculated according to the universal language model. The method and principle are similar to those of conventional input method using the universal language model and is not described herein.

Each time the user inputs a word using the input method software, the word inputted by the user is recorded. The language model is updated according to the word inputted by the user. The user language model is stored in association with the user identifier. When next time a word is inputted, the on-screen probability of each candidate sentence in the candidate work list can be calculated according to both the user language model and the universal language model.

In one example, the user language model may use a Bigram language model. The creation of the model has been described above and is not repeated herein.

In one example, the process of calculating the on-screen probability of each candidate sentence in the candidate sentence list according to the user language model and the universal language model includes: perform a linear interpolation operation to the user language model and the universal language model to generate a mixed model, and calculate the on-screen probability of each candidate sentence in the candidate sentence list according to the mixed model.

The on-screen probability of the candidate sentence in the candidate sentence list is a probability that the candidate sentence may be selected by the user calculated by the mixed model. The greater the on-screen probability, the more forward position that the candidate sentence is ranked in the candidate sentence list. Thus, the user can find a required word more rapidly. The text inputting speed is increased.

At block S308, the user device sorts the candidate sentences in the candidate sentence list according to their on-screen probabilities and outputs the sorted candidate sentence list.

Figure 4:
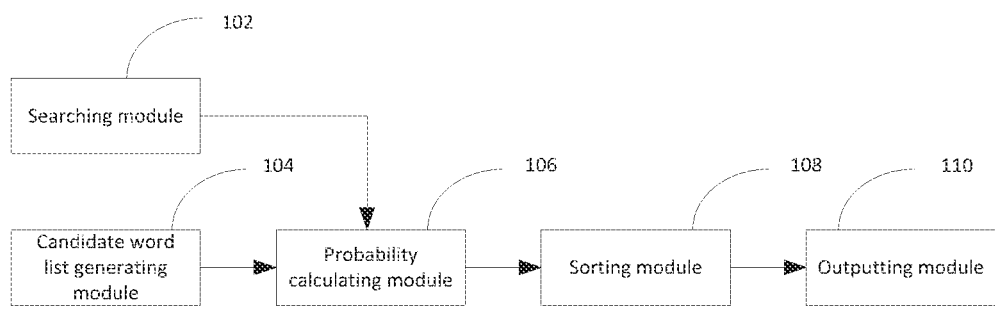
FIG. 4 is a schematic diagram illustrating a text inputting system according to an example of the present disclosure.

In one example, as shown in FIG. 4, a text inputting system includes: a searching module 102, a candidate sentence list generating module 104, a probability calculating module 106, a sorting module 108 and an outputting module 110.

The searching module 102 obtains a user identifier and finds a corresponding user language model according to the user identifier.

The user identifier identifies the user uniquely. It may be an account registered by the user in the input method software, or an identifier number assigned for the user, or an IP address or MAC address associated with a device of the user.

Figure 5:
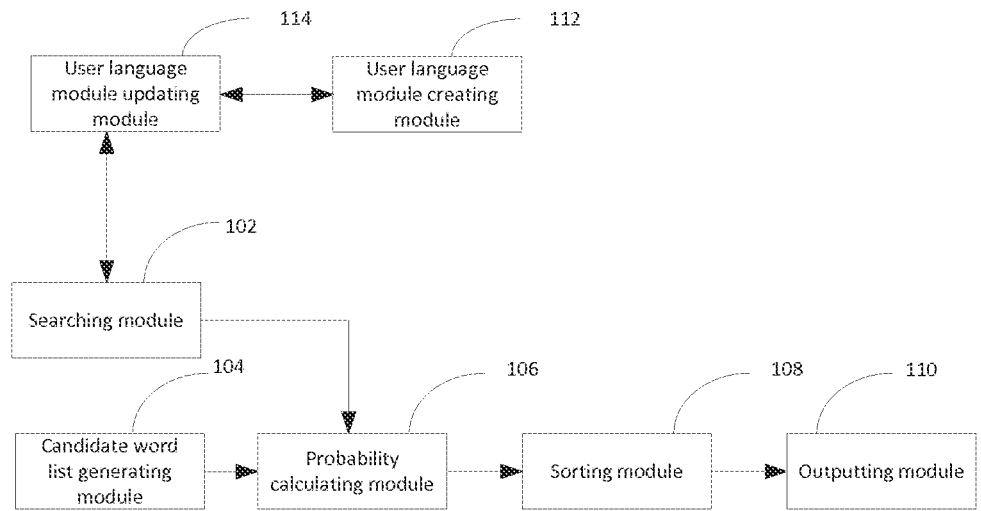
FIG. 5 is a schematic diagram illustrating a text inputting system according to another example of the present disclosure.

In one example, as shown in FIG. 5, the above text inputting system may further include: a user language model creating module 112 and a user language model updating module 114.

The user language model creating module 112 may be configured in the user device or at the server side. The created user language model may be stored in the user device or in the server.

The user language model updating module 114 updates, each time the user inputs a word, the user language model according to the word inputted by the user.

The user language model updating module 114 may be located in the user device or in the server side. The updated user language model may be stored in the user device or uploaded by the user device to the server for storage. Thus, the user language model in the server may be updated continuously along with the input of the user. Thus, the user language model in the server becomes more and more accurate. When the user uses the input method software on different user devices, the server issues the newest user language model to the user device. Thus, the synchronization of the user language model is realized and it is fit for different user devices.

The candidate sentence list generating module 114 obtains the user input and generates a candidate sentence list according to the user input.

The user input may be a speech input, handwritten characters, optical characters or strings. A conventional text inputting method may be used to find candidate sentences that match the user input to generate the candidate sentence list.

In one example, the candidate sentence list generating module 104 may be in the server which uses the conventional text inputting method to find candidate sentences that match the user input to generate the candidate sentence list. The processing of the text inputting method is implemented by the server. This text inputting method is also referred to "cloud input method".

The probability calculating module 106 obtains a universal language model and calculates an on-screen probability of each candidate sentence in the candidate sentence list according to the user language model and the universal language model.

The universal language model may be a conventional statistical language model obtained through training using a large amount of material obtained from texts inputted by a large number of users on the Internet. The user language model is corresponding to a unique user. Different users correspond to different user language models.

The user language model is obtained through training according to the inputs of the user. It should be noted that, during the first time input using the input method software, since the user language model has not been updated, the on-screen probability of each candidate sentence in the candidate sentence list may be calculated according to the universal language model. The method and principle are similar to those of conventional input method using the universal language model and is not described herein.

Each time the user inputs a word using the input method software, the word inputted by the user is recorded. The language model is updated according to the word inputted by the user. The user language model is stored in association with the user identifier. When next time a word is inputted, the on-screen probability of each candidate sentence in the candidate work list can be calculated according to both the user language model and the universal language model.

The sorting module 108 sorts the candidate sentences in the candidate sentence list according to their on-screen probabilities.

In this example, the candidate sentences in the candidate sentence list are sorted in an ascending order according to their on-screen probabilities. Top-ranked words conform to the user's language habits better and may be desired by the user. Thus, the user may find a required candidate sentence more rapidly, which increase a text inputting accuracy and a text inputting speed.

The outputting module 110 outputs the sorted candidate sentence list.

The user may select a required candidate sentence from the candidate sentence list. The selected candidate sentence is outputted from the input method software to various kinds of application programs, e.g., text document, notebook, Presentation document, etc.

In one example, the user language model updating module 114 records word information and word frequency information of the user input, obtains the word information and the word frequency information, divides the word, performs a word frequency processing to the divided word according to the word frequency information, and updates the user language model according to the divided word and the processed word frequency, wherein the word frequency denotes a number of times that the word emerges in the user word library.

In one example, the same language model may be adopted for the user language model and the universal language model, e.g., an Ngram language model may be adopted. But the training sets of the user language model and the universal language model are different. The training set of the user language model is a set of all words in the user word library which corresponds to a unique user. The training set of the universal language model is a set of words inputted by a large amount of users. It may be obtained from the Internet.

A probability calculation formula of the user language model may be as follows:

$$P_{user}(S) = \prod_{i=1}^{m} P_{user}(w_i | w_{i-n+1} \ldots w_{i-1}),$$

wherein $P_{user}(S)$ denotes a probability of a sentence $S=w_1 w_2 \ldots w_m$ which includes m words. The sentence S includes words $w_1 w_z \ldots w_m$, wherein $w_i$ is a word in sentence S which includes m words. For example, a sentence "have you eat today" may be divided into "have/you/eat/today". A maximum likelihood method may be used to calculate a probability statistics of $P_{user}(w_i|w_{i-n+1} \ldots w_{i-1})$. The calculation formula may be as shown in following:

$$p(w_i | w_{i-n+1} \ldots w_{i-1}) = \frac{c(w_{i-n+1} \ldots w_{i-1} w_i)}{c(w_{i-n+1} \ldots w_{i-1})},$$

wherein $c(w_{i-n+1} \ldots w_{i-1} w_i)$ denotes a number of times that the word sequence $w_{i-n+1} \ldots w_{i-1} w_i$ emerge in the training set, $c(w_{i-n+1} \ldots w_{i-1})$ denotes a number of times that the word sequence $w_{i-n+1} \ldots w_{i-1}$ emerge in the training set. The training set is a set of all word sequences in the user word library.

In one example, the user language model may adopt a lower-grade language model, e.g., a Unigram language model. Compared with the Ngram language model, this language model occupies less storage space and is fit for use on mobile terminals. In this example, a probability calculation formula of the user language model is as follows:

$$P_{user}(S) = \prod_{i=1}^{m} P_{user}(w_i),$$

wherein $P_{user}(S)$ denotes a probability of sentence $S = w_1 w_2 \ldots w_m$ which includes m words.

In another example of the present disclosure, the user language model may use a Bigram language model. Compared with the above two language models, this language model has higher model-creating speed and is fit for use in the cloud input method.

In this example, a probability calculating formula used for the language model is as follows:

$$P_{user}(S) = \prod_{i=1}^{m} P_{user}(w_i | w_{i-1}),$$

wherein $P_{user}(S)$ denotes a probability of a sentence $S = w_1 w_2 \ldots w_m$ including m words; $P_{user}(w_i|w_{i-1})$ denotes that sentence S is divided into two words $w_i$ and $w_{i-1}$, a calculation formula of $P_{user}(w_i|w_{i-1})$ is as follows:

$$p(w_i | w_{i-1}) = \frac{c(w_{i-1} w_i)}{c(w_{i-1})},$$

wherein $c(w_{i-1}w_i)$ denotes the number of times that sentence S emerges in the training set, $c(w_{i-1})$ denotes the number of times that word $w_{i-1}$ emerges in the training set.

In one example, the on-screen probability generating module 106 performs a linear interpolation to the user language model and the universal language model to generate a mixed model, and calculates the on-screen probability of each candidate sentence in the candidate sentence list according to the mixed model.

In this example, the universal language model may be the conventional Ngram language model. Thus, a conditional probability of the user language model is combined with that of the universal language model. A mixed conditional probability is calculated. The calculation formula may be as follows:

$$P_{mixture}(w_i|w_{i-n+1} \ldots w_{i-1}) = a \times P(w_i|w_{i-n+1} \ldots w_{i-1}) + (1-a) \times P_{user}(w_i|w_{i-n+1} \ldots w_{i-1}),$$

wherein $P_{mixture}(w_i|w_{i-n+1} \ldots w_{i-1})$ denotes the mixed conditional probability, $P(w_i|w_{i-n+1} \ldots w_{i-1})$ denotes the conditional probability of the universal language model, $P_{user}(w_i|w_{i-n+1} \ldots w_{i-1})$ denotes the conditional probability of the user language model, a denotes an interpolation parameter with a value between 0 and 1.

According to the mixed conditional probability, the generated mixed model is as follows:

$$P(S) = \prod_{i=1}^{m} P_{mixture}(w_i | w_{i-n+1} \ldots w_{i-1}),$$

wherein $P(S)$ denotes a probability of sentence $S = w_1 w_2 \ldots w_m$ including m words.

The on-screen probability of the candidate sentence in the candidate sentence list is a probability that the candidate sentence may be selected by the user calculated by the mixed model. The greater the on-screen probability, the more forward position that the candidate sentence is ranked in the candidate sentence list. Thus, the user can find a required word more rapidly. The text inputting speed is increased.

An example of the present disclosure further provides a text inputting method and apparatus. Hereinafter, detailed description is provided.

At present, popular language modeling method includes a statistical language modeling method and an Ngram language modeling method. Hereinafter, the methods are briefly described.

A conventional language modeling method takes probability theory and mathematical statistics theory as a basis to calculate probability of a Chinese sentence, such that a correct sentence has a higher probability than an incorrect sentence to be outputted. For example, for a Chinese sentence "SHUO MING CI CHU HAN YU YU JU DE GAI LV", in the statistical language modeling, the Chinese sentence may be divided into several words, e.g., "SHUO MING\CI CHU . . . ". For a Chinese sentence $S = w_1 w_2 \ldots w_m$ including m (m is an nature number) words, according to Bayes theory, the Chinese sentence probability (probability of being correctly outputted) may be a product of conditional probabilities of multiple words, i.e., $$P(S) = P(w_1 w_2 \ldots w_m) = \prod_{i=1}^{m} p(w_i / w_1 w_2 \ldots w_{i-1}),$$

wherein $w_i$ denotes the i th word in the Chinese sentence; $p(w_i|w_1 w_2 \ldots w_{i-1})$ denotes a conditional probability of word $w_i$ in the Chinese sentence $w_1 w_2 \ldots w_m$.

It can be seen from the above formula that, a parameter space of the conditional probability $p(w_i/w_1 w_2 \ldots w_{i-1})$ increases exponentially with the increase of variable i. If the variable i is large, for current scale of training material, it is hard to estimate an accurate value of the probability $p(w_i/w_1 w_2 \ldots w_{i-1})$. The training material refer to a set of sequential texts organized according to categories formed based on a large number of training texts according to a statistical method. The training material may be processed in batch by a computer. Therefore, in practical language modeling methods, the conditional probability $p(w_i/w_1 w_2 \ldots w_{i-1})$ is simplified more or less, and a standard Ngram language modeling method is provided.

The standard Ngram language model is a popular statistical language model. It takes a Chinese sentence as a Markov sequence and meets a Markov feature. In particular, the standard Ngram language model has following assumptions to the conditional probability $p(w_i/w_1 w_2 \ldots w_{i-1})$ in the statistical language model.

(1) Limited history assumption: the conditional probability of a word in a currently inputted sentence is merely relevant to former n−1 words, but is not relevant to the whole Chinese sentence, wherein n is a natural number defined in advance.

(2) Time homogeneity assumption: the conditional probability of the current word is irrelevant to the position that the word emerges in the Chinese sentence.

Based on the above assumptions, the formula for calculating the probability in the standard Ngram model may be simplified as follows:

$$P(S) = \prod_{i=1}^{m} p(w_i / w_{i-n+1} w_{i-n+2} \ldots w_{i-1}).$$

Based on the above assumptions, the conditional probability $p(w_i/w_1 w_2 \ldots w_{i-1})$ in the standard statistical language model is simplified as $p(w_i/w_{i-n+1} w_{i-n+2} \ldots w_{i-1})$ in the standard Ngram language model. In the new probability calculating formula, the number of history words related to the current word is fixed to be n−1, rather than the variable i−1 in the standard statistical language model. Thus, the language parameter space is reduced. It is possible to estimate the Ngram probability accurately based on the existing training material. Thus, the standard Ngram language model is practicable.

In the standard Ngram language model, the conditional probability $p(w_i/w_{i-n+1} w_{i-n+2} \ldots w_{i-1})$ is estimated using a maximum likelihood estimation method.

The estimation formula is as shown in the following.

$$p(w_i/w_{i-n+1}w_{i-n+2} \ldots w_{i-1}) = \frac{c(w_{i-n+1} \ldots w_{i-1}w_i)}{c(w_{i-n+1} \ldots w_{i-2}w_{i-1})},$$

wherein $c(w_{i-n+1} w_{i-1} w_i)$ denotes a number of times that a word sequence $w_{i-n+1} \ldots w_{i-1} w_i$ (some words in the sentence) emerges in the training material of the Ngram language model.

However, the standard Ngram language modeling method also has its defects. On the one hand, the standard Ngram language model is a simplex model. In a practical application, users may have variable and unlimited requirements such as Chinese input, handwriting recognizing and voice recognizing. For example, a user may write a technical report sometimes and chat on the Internet at other times. Under these two situations, Chinese input requirements of the user are different. For another example, users in different ages may have different speaking habits due to their different living experiences. Reflected on the Chinese input, contents constantly inputted by these users have a big difference. Therefore, a simplex model cannot meet different requirements for inputting Chinese of users of different ages and requirements of one user under different situations. For the different requirements, if the same model is adopted, accuracy of recognizing the input of the user is affected. On the other hand, the standard Ngram language model does not have a self-study mechanism. Once parameters in the standard Ngram language model are determined, the parameters cannot be adjusted intelligently according to inputting habits of the user. Thus, accuracy ratio for recognizing the input of the user is relatively low.

A method and an apparatus provided by examples of the present disclosure can meet the requirement for inputting Chinese of different users and can increase the recognizing accuracy ratio.

The standard Ngram language model which is currently used for language modeling is a simplex model and cannot meet different requirements for inputting sentences of different users. Since it does not have the self-study mechanism, it cannot learn and perform an intelligent adjustment according to the inputting habits of the user. Thus, the accuracy ratio of recognizing the input of the user is low. Hereinafter, Chinese is taken as an exemplary input of the user to describe the solution of the present disclosure.

In a practical application, it is found through collecting statistics that, contents (sentence) currently inputted by the user has a short time stability, i.e., the input of the user within a time period is generally around one topic. Therefore, contents currently inputted by the user have a relatively big probability to emerge in subsequent input again. In other words, whichever input manner such as speech input, handwritten or keyboard input is adopted, the input of the user within one time period is around the same topic. The current inputted topic or contents have the "short time stability".

Therefore, based on the above analysis, in an example of the present disclosure, in contrast to the standard Ngram language model, a cache-based language modeling method is provided. Based on a cache data structure, contents currently inputted by the user are stored. A mathematical analysis is performed to the data cached to create a mathematical model of the user input. Along with the input of the user, contents in the cache data structure are updated continuously. Inputting habits of the user are learnt in real-time. Thus, the man-machine interaction becomes more intelligent. The created mathematical model of the user input becomes more and more accurate and meets real input requirement of the user. Therefore, during the subsequent input of the user, a more accurate recognizing may be performed to the input of the user according to the created mathematical model. The dynamical learning is realized and the input requirement of the user is met.

Figure 6:
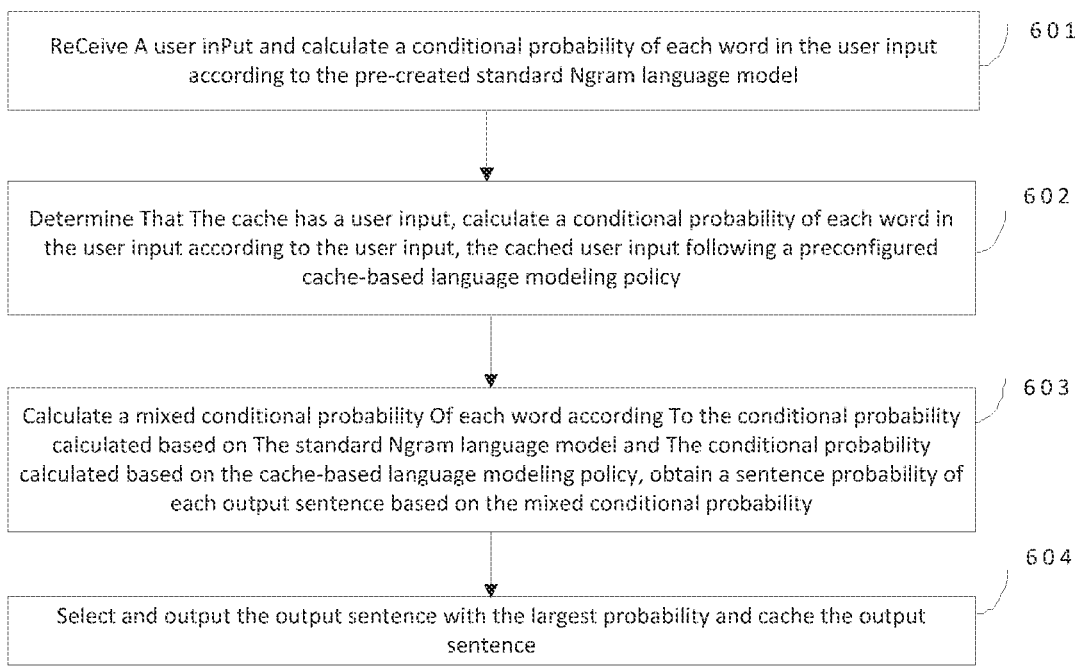
FIG. 6 is a flowchart illustrating a language modeling method according to an example of the present disclosure.

FIG. 6 is a flowchart illustrating a language modeling method according to an example of the present disclosure. As shown in FIG. 6, the method includes the following.

At block 601, an input of a user is received. A conditional probability of each word in the input of the user is respectively calculated according to a standard Ngram language model created in advance.

In this block, the input of the user includes: contents inputted via an input method, handwritten contents and speech input, etc.

For the contents inputted via an input method, a keyboard processing program receives characters inputted by the user, performs a recognizing processing to the characters according to the input method to obtain pinyin information, outputs the pinyin information to a mapping unit which maps the pinyin information to corresponding candidate characters to form the user input.

For the handwritten input, a pre-configured handwriting recognizing program retrieves handwriting information of the user, obtains handwriting information. After being processed by a mapping unit, the handwriting information is mapped to corresponding candidate characters to form the user input.

For the speech input, a pre-configured voice processing program performs a sampling, quantification, filtering, and noise-removing processing to obtain audio information. After being processed by a mapping unit, the audio information is mapped to corresponding candidate characters to form the user input.

In the above example, the processing to the pinyin information, the handwriting information and the audio information performed by the mapping unit may be obtained from relevant technical documents and is not described herein.

The calculation of the conditional probability of each word in the user input according to the standard Ngram language model is similar to those in the related art and is not described herein.

At block 602, a pre-cached user input is determined. According to the user input and the pre-cached user input, a conditional probability of each word in the user input is calculated according to a preconfigured cache-based language modeling policy.

In this block, if the user input is a first input, the pre-cached user input is null. The calculation of the probability of each word is similar to those in the related art.

A preconfigured cache-based language modeling policy is as follows:

$$p'_{cache}(w_i / w_{i-n+1} w_{i-n+2} \ldots w_{i-1}, t_i) = f(t_i) x \frac{c(w_{i-n+1} \ldots w_{i-1} w_i)}{c(w_{i-n+1} \ldots w_{i-2} w_{i-1})},$$

wherein $p'_{cache}(w_i/w_{i-n+1} \ w_{i-n+2} \ldots w_{i-1}, t_i)$ denotes a cached conditional probability of the ith word $w_i$;

$c(w_{i-n+1} \ldots w_{i-1} \ w_i)$ denotes a number of times that a word sequence $w_{i-n+1} \ldots w_{i-1} \ w_i$ emerges in cached training material, i.e., the number of times that the word sequence which includes the i th word and n (a pre-defined constant) words before the i th word emerges in the cached training material;

$c(w_{i-n+1} \ldots w_{i-2} \ w_{i-1})$ denotes a word sequence $w_{i-n+1} \ldots w_{i-2} \ w_{i-1}$ emerges in the cached training material, i.e., the number of times that the word sequence which includes a predefined constant number of words before the i th word emerges in the cached training material; and $f(t_i)$ denotes a time function.

This formula is described in further detail in the following.

At block 603, a mixed conditional probability is calculated according to the conditional probability of each word calculated based on the standard Ngram language model and the conditional probability of each word calculated according to the cached modeling policy, and a sentence probability of each output sentence is calculated based on the mixed conditional probability.

In this block, a formula for calculating the mixed conditional probability may be as follows:

$$p_{mixture}(w_i / i_{-n+1} w_{i-n+2} \ldots w_{i-1}) = \alpha x p(w_i / w_{i-n+1} w_{i-n+2} \ldots w_{i-1}) +$$
$$(1 - \alpha) x p_{cache}(w_i / w_{i-n+1} w_{i-n+2} \ldots w_{i-1}, t_i),$$

wherein $\alpha$ denotes an interpolation parameter which is a constant between 0 and 1. Its value may be determined according to a practical requirement;

$p(w_i/w_{i-n+1} \ w_{i-n+2} \ldots w_{i-1})$ denotes the standard conditional probability of the i th word $w_i$ based on the standard Ngram language model.

A formula for calculating the sentence probability of each output sentence (i.e. the on-screen probability) is as follows.

$$P(S) = \prod_{i=1}^{m} p_{mixture}(w_i / w_{i-n+1} w_{i-n+2} \ldots w_{i-1}),$$

At block 604, an output sentence with a largest probability is outputted and cached.

Figure 7:
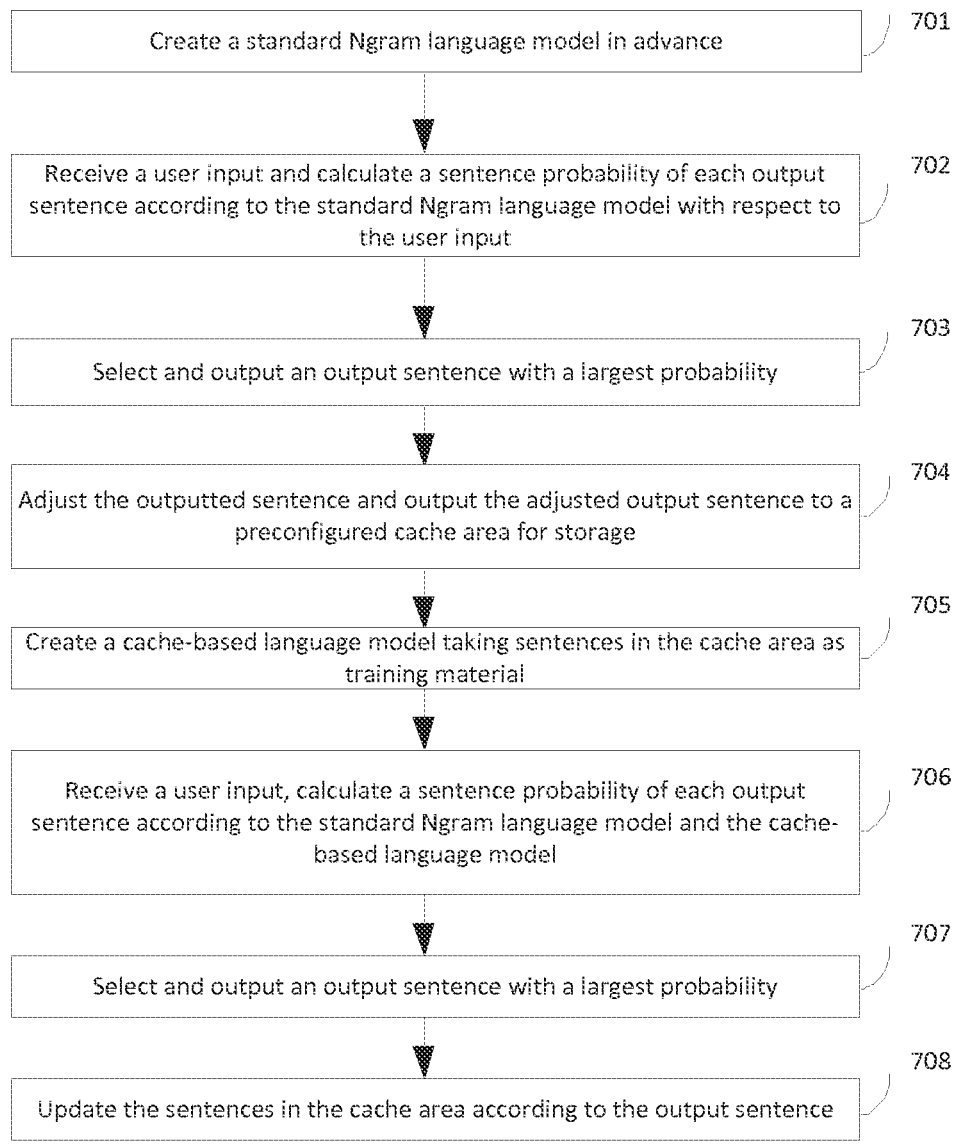
FIG. 7 is a flowchart illustrating a language modeling method according to another example of the present disclosure.

FIG. 7 is a flowchart illustrating a language modeling method according to an example of the present disclosure. As shown in FIG. 7, the method includes the following.

At block 701, a standard Ngram language model is created in advance.

In this block, the creation of the standard Ngram language model is similar to that in the related art. The standard Ngram language model may be obtained through training material using a maximum likelihood estimation method.

At this time, the user does not input content yet. Therefore, a preconfigured cache is null.

At block 702, input content of the user is received. A sentence probability (i.e., on-screen probability) of each output sentence in the input content of the user is calculated according to the preconfigured standard Ngram language model.

In this block, the user may input the content via speech, handwritten characters, optical characters or keyboard input. When the user starts to input, the content is mapped by a mapping unit to candidate words which are processed according to the standard Ngram language model, i.e., a kernel calculation procedure of the input content. The probability of each possible output sentence is calculated according to the standard Ngram language model. The procedure is similar to those in the related art and is not described herein.

At block 703, an output sentence with a largest probability is selected and outputted.

In this block, according to the probability of each possible output sentence calculated according to the standard Ngram language model, an output sentence with a largest probability is selected as the user output, i.e., the output sentence with the largest probability is taken as a recognized Chinese sentence. One Chinese sentence may include one or more words.

At block 704, the output sentence is adjusted and the adjusted output sentence is outputted to a pre-configured cache area.

In this block, the user may check whether the output sentence meets his input requirement. If they do not match, adjustment may be performed. For example, a user expected output sentence is "ZHE SHI SHI SHI" (Chinese characters corresponding to "this is fact"). The output sentence with the largest probability calculated based on the standard Ngram language model, i.e., the recognized result of the user input is "ZHE SHI SHI SHI" (Chinese characters corresponding to "this is real time"). This does not match the expected input requirement of the user. At this time, the user needs to adjust "SHI SHI" (Chinese characters corresponding to "real time") to "SHI SHI" (Chinese characters corresponding to "fact") according to candidates of the input method and outputs the adjusted output sentence to the preconfigured cache area.

In a practical application, the contents cached in the cache area may be identified by the user.

At block 705, the sentences in the cache area are taken as training material to create a cache-based language model.

In this block, the cache-based language model is based on the contents stored in the cache area. The contents in the cache area are obtained according to recent inputs of the user and thus can be regarded as a user-specific, small training material library.

On the one hand, similar as the standard Ngram language model, the cache-based language model describes statistical feature of the current input of the user by calculating a conditional probability between words. A Chinese sentence probability may be calculated as follows.

$$P_{cache}(S) = \prod_{i=1}^{m} p_{cache}(w_i / w_{i-n+1} w_{i-n+2} \ldots w_{i-1}),$$

wherein $P_{cache}(S)$ denotes a probability of a Chinese sentence calculated according to the contents in the cache area;

m denotes the number of words included in the Chinese sentence;

$w_i$ denotes the i th word included in the Chinese sentence;

$p_{cache}(w_i/w_{i-n+1} \ w_{i-n+2} \ldots w_{i-1})$ denotes the conditional probability of the word $w_i$ in the Chinese sentence; and n denotes a predefined constant.

On the other hand, it is known based on the previous statistical analysis that, the user input has the "short time stability", wherein "short time" denotes a time dimension, i.e., current input of the user is merely relevant to the recent input of the user but is irrelevant to the contents inputted by the user long time ago. That is to say, contents currently inputted by the user are usually stable. The current contents are related to the current input topic. After a while, the topic inputted by the user changes. At that time, the input content of the user is not closely related to the previous topic of the user. Therefore, based on the cache-based language model, the current input word of the user is more relevant to the word recently added in the cache area, but is less relevant to the words added in the cache area long time ago.

Different from the standard Ngram language model, the condition probability of the word in the cache area is related to not only the context words of the current word, but also the time that the current word is added into the cache area. Therefore, considering the time factor, the probability formula in the cache-based language model may be adjusted as follows.

$$P'_{cache}(S) = \prod_{i=1}^{m} p'_{cache}(w_i / w_{i-n+1} w_{i-n+2} \ldots w_{i-1}, t).$$

Compared with the previous conditional probability $$P_{cache}(S) = \prod_{i=1}^{m} p_{cache}(w_i / w_{i-n+1} w_{i-n+2} \ldots w_{i-1}),$$

the adjusted sentence probability $$P'_{cache}(S) = \prod_{i=1}^{m} p'_{cache}(w_i / w_{i-n+1} w_{i-n+2} \ldots w_{i-1}, t)$$

considers the time variable parameter t, i.e., the conditional probability that the current word $w_i$ emerges is relevant to not only the context words $w_{i-n+1} w_{i-n+2} \ldots w_{i-1}$ but also the time that the word $w_i$ is added into the cache area last time.

In the cache-based language model, the conditional probability of each word is relevant to not only the context words of this word but also the time that the word is added into the cache area last time. However, the maximum likelihood estimation method in the standard Ngram language model considers only the context words but not the time information. Therefore, it cannot be used for training the parameters required by the cache-based language model. In order to estimate the conditional probability of the word in the cache-based language model, the maximum likelihood estimation method is improved by adding time information. A following formula is adopted to calculate the value of the conditional probability $p'_{cache}(w_i/w_{i-n+1} w_{i-n+2} \ldots w_{i-1}, t_i)$.

$$p'_{cache}(w_i / w_{i-n+1} w_{i-n+2} \ldots w_{i-1}, t_i) = f(t_i) \times \frac{c(w_{i-n+1} \ldots w_{i-1} w_i)}{c(w_{i-n+1} \ldots w_{i-2} w_i)}.$$

Different from the maximum likelihood estimation method, in the above formula, a time function $f(t)$ is considered to describe the effect of the time factor to the sentence conditional probability. The time function $f(t_i)$ is defined as follows.

$$f(t_i) = \frac{\partial}{t_i},$$

wherein $t_i$ denotes a time variable parameter, i.e., a time interval between the time that word $w_i$ enters into the cache area and the time that the current word is inputted by the user.

In a practical application, if a bottom data structure of the cache area is implemented by a queue, the value of the time variable parameter may be a position that the word $w_i$ in the cache queue. For example, for a word firstly enters into the cache area, if the word $w_i$ is in the head of the queue, suppose that the position index is 1, then the value of the time variable parameter $t_i$ corresponding to the word $w_i$ in the formula is 1.

$\partial$ is a predefined constant to adjust a weight of the time variable parameter in the conditional probability estimation.

It can be known from the above that, the earlier the word $w_i$ enters into the cache area, the longer the time interval between the word $w_i$ enters into the cache area and the user inputs the sentence, and the larger the value of the time variable parameter $t_i$, the smaller the value of the time function $f(t_i)$. Thus, the value of the conditional probability $p'_{cache}(w_i/w_{i-n+1} w_{i-n+2} \ldots w_{i-1}, t_i)$ is smaller. In contrast, the later that the word $w_i$ enters into the cache area, the shorter the time interval between the word $w_i$ enters into the cache area and the user inputs the sentence, the smaller that the value of the time variable parameter $t_i$, and the larger the time function $f(t_i)$. Thus, the value of the conditional probability $p'_{cache}(w_i/w_{i-n+1} w_{i-n+2} \ldots w_{i-1}, t_i)$ is larger.

At block 706, content inputted by the user is received. A sentence probability of each output sentence is calculated for the content inputted by the user according to the pre-created standard Ngram language model and the newly-created cache-based language model.

In this block, during the input procedure of the user, a mixed model is formed based on the standard Ngram language model and the newly-created cache-based language model. The input of the user is processed according to the mixed model and a processing result is generated.

In an example of the present disclosure, a linear interpolation method is adopted to combine the conditional probability $p'_{cache}(w_i/w_{i-n+1} w_{i-n+2} \ldots w_{i-1}, t_i)$ in the cache-based language model and the conditional probability $p(w_i/w_{i-n+1} w_{i-n+2} \ldots w_{i-1})$ in the standard Ngram language model. A mixed conditional probability $p_{mixture}(w_i/w_{i-n+1} w_{i-n+2} \ldots w_{i-1})$ is calculated according to the following formula.

$$p_{mixture}(w_i/w_{i-n+1}w_{i-n+2} \ldots w_{i-1}) = \alpha \times p(w_i/w_{i-n+1} w_{i-n+2} \ldots w_{i-1}) + (1-\alpha) \times p'_{cache}(w_i/w_{i-n+1} w_{i-n+2} \ldots w_{i-1}, t_i),$$

wherein $\alpha$ denotes an interpolation parameter which is a constant between 0 and 1. It is used for adjusting weights of the conditional probability in the cache-based language model and the conditional probability in the standard Ngram language model in the mixed model.

According to the above mixed model, the probability of a Chinese sentence $S = w_1 w_2 \ldots w_m$ which includes m words may be calculated as follows.

$$P(S) = \prod_{i=1}^{m} p_{mixture}(w_i / w_{i-n+1} w_{i-n+2} \ldots w_{i-1}).$$

For example, if the user inputted "XIAO JING HUI SHI TENG XUN YUAN GONG" previously. After recognizing based on the standard Ngram language model, three characters "XIAO", "JING" and "HUI", and words "SHI", "TENG XUN YUAN GONG" are cached in the cache area. When the user inputs "XIAO JING HUI XIE LE YI PIAN ZHUAN LI" later, the three characters "XIAO", "JING" and "HUI" stored in the cache area in the cache-based language area affect the current inputted sentence of the user. If there is no characters "XIAO", "JING" and "HUI" in the cache area, "XIAO JING HUI" has a higher probability to be falsely converted when the user inputs. However, according to the information cached in the cache area, "XIAO JING HUI" has a higher probability to be correctly converted. Therefore, the input "XIE JING HUI XIE LE YI PIAN ZHUAN LI" has a higher probability to be correctly converted by the input method.

It can be seen from the above that, the cache-based language model is created continuously based on the inputs of the user. It reflects current input scenario information of the user, and reflects inputting habits of the user on the other hand. The combining of the standard Ngram language model with the cache-based language model effectively learns from and is self-adapted to the input scenario and inputting habit of the user.

At block 707, an output sentence with a largest probability is outputted.

At block 708, the sentence cached in the cache area is updated according to the outputted sentence.

Experiments show that, compared with the standard Ngram language model, the cache-based language modeling method provided by the example of the present disclosure has a higher accuracy ratio for recognizing the input of the user. In addition, the Chinese input software based on this modeling method is more intelligent.

It should be noted that, the language modeling method provided by the example of the present disclosure is applicable not only for Chinese input method, but also input methods of other Asian languages such as Japanese, Korean, and Cambodia. The modeling method for these languages is similar to that of Chinese and is not repeated herein.

Figure 8:
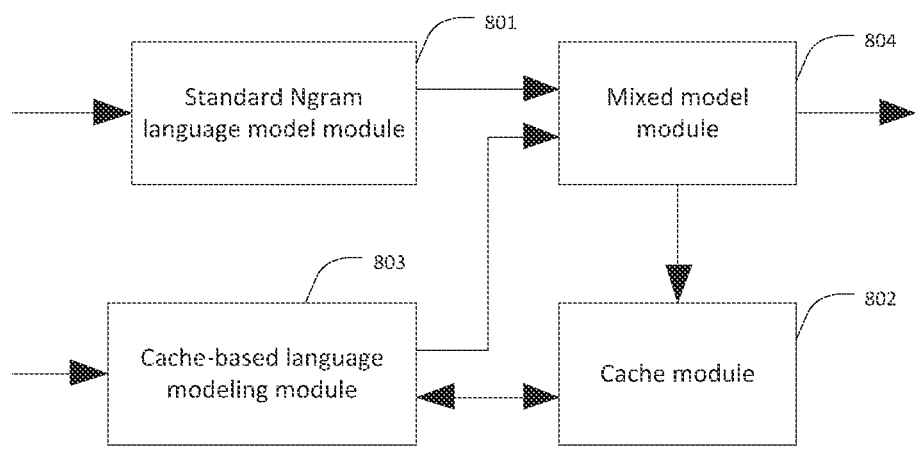
FIG. 8 is a schematic diagram illustrating a language modeling apparatus according to an example of the present disclosure.

FIG. 8 is a schematic diagram illustrating a structure of a language modeling apparatus according to an example of the present disclosure. As shown in FIG. 8, the apparatus includes: a standard Ngram language model module 801, a cache module 802, a cache-based language modeling module 803 and a mixed model module 804.

The standard Ngram language model module 801 receives an input of the user, respectively calculates a standard conditional probability of each word in the user input and outputs the conditional probabilities to the mixed model module 804.

In this example, the formula for calculating the conditional probability of each word by the standard Ngram language model module 801 is as follows.

$$p(w_i / w_{i-m+1} w_{i-n+2} \ldots w_{i-1}) = \frac{c(w_{i-n+1} \ldots w_{i-1} w_i)}{c(w_{i-n+1} \ldots w_{i-2} w_i)},$$

wherein $C(w_{i-n+1} \ldots w_{i-1} w_i)$ denotes a number of times that a word sequence $w_{i-n+1} \ldots w_{i-1} w_i$ emerges in training material of the standard Ngram language model;

$w_i$ denotes the i th word in the Chinese sentence; and n is a preconfigured constant.

The cache module 802 caches a sentence outputted by the mixed model module 804.

The cache-based language modeling module 803 respectively calculates a conditional probability of each word in the user input according to the user input and sentences cached in the cache module 802 based on a pre-configured cache-based language modeling policy, and outputs the conditional probabilities to the mixed model module 804.

In this example, the cache-based language modeling module 803 may calculate the conditional probability of each word according to a following formula.

$$p'_{cache}(w_i / w_{i-n+1} w_{i-n+2} \ldots W_{i-1}, t_i) = f(t_i) x \frac{c(w_{i-n+1} \ldots w_{i-1} w_i)}{c(w_{i-n+1} \ldots w_{i-2} w_i)},$$

wherein $C(w_{i-n+1} \ldots w_{i-1} w_i)$ denotes a number of times that the word sequence $w_{i-n+1} \ldots w_{i-1} w_i$ emerges in training material of the cache-based language model;

$w_i$ denotes the i th word in the Chinese sentence;

n is a preconfigured constant; and $f(t_i)$ denotes a time function.

The mixed model module 804 calculates a mixed conditional probability of each word according to the standard conditional probability and the cache conditional probability, obtains a sentence probability of each output sentence according to the mixed conditional probability, selects and outputs an output sentence with a largest probability.

In one example, a calculation formula for the mixed conditional probability is as follows.

$$p_{mixture}(w_i/w_{i-n+1} w_{i-n+2} \ldots w_{i-1}) = \alpha \times p(w_i/w_{i-n+1} w_{i-n+2} \ldots w_{i-1}) + (1-\alpha) \times p'_{cache}(w_i/w_{i-n+1} w_{i-n+2} \ldots w_{i-1}, t_i)'$$

wherein is an interpolation parameter which is a constant between 0 and 1.

The sentence probability of the output sentence may be calculated as follows.

$$P(S) = \prod_{i=1}^{m} p_{mixture}(w_i / w_{i-n+1} w_{i-n+2} \ldots w_{i-1}),$$

wherein m denotes the number of words included in the Chinese sentence.

The standard Ngram language model module 801 includes: a first word sequence frequency counting unit, a second word sequence frequency counting unit and a standard conditional probability calculating unit (not shown in the Figure).

The first word sequence frequency counting unit obtains a number of times $k'_i$ that a word sequence which includes the i th word and a predefined constant number of words before the i th word emerges in the training material of the standard Ngram language model, and outputs $k'_i$ to the standard conditional probability calculating unit.

The second word sequence frequency counting unit obtains a number of times $k'_{i-1}$ that a word sequence which includes the predefined constant number of words before the i th word emerges in the training material of the standard Ngram language model, and outputs $k'_{i-1}$ to the standard conditional probability calculating unit.

The standard probability calculating unit calculates a ratio of $k'_i$ to $k'_{i-1}$, takes the ratio as the standard conditional probability of the i th word in the user input.

The cache-based language modeling module 803 includes: a third word sequence frequency counting unit, a fourth word sequence frequency counting unit, a time function value obtaining unit and a cache conditional probability calculating unit (not shown in the Figure).

The third word sequence frequency counting unit obtains a number of times $k_i$ that a word sequence which includes the i th word and a predefined constant number of words before the i th word emerges in the cached training material, and outputs $k_i$ to the standard conditional probability calculating unit.

The fourth word sequence frequency counting unit obtains a number of times $k_{i-1}$ that a word sequence which includes the predefined constant number of words before the i th word emerges in the cached training material, and outputs $k_{i-1}$ to the standard conditional probability calculating unit.

The time function value calculating unit obtains a time function value of the i th word and outputs the value to the cache conditional probability calculating unit.

The cache conditional probability calculating unit calculates a ratio of $k_i$ to $k_{i-1}$, multiplies the ratio with the time function value of the i th word to obtain the cache conditional probability of the i th word in the user input.

The mixed model module 804 includes: an interpolation parameter storage unit, a first multiplying unit, a second multiplying unit, a mixed conditional probability calculating unit, a sentence probability calculating unit and an output sentence selecting unit (not shown in the Figure).

The interpolation parameter storage unit stores an interpolation parameter whose value is configured between 0 and 1 in advance.

The first multiplying unit calculates a product of the interpolation parameter stored in the interpolation parameter storage unit and the standard conditional probability of the i th word and outputs the product to the mixed conditional probability calculating unit.

The second multiplying unit calculates a difference between 1 and the interpolation and calculates a product of the different and the cache conditional probability of the i th word, and outputs the product to the mixed conditional probability calculating unit.

The mixed conditional probability calculating unit adds the products related to the i th word and takes the sum as the mixed conditional probability of the i th word.

The sentence probability calculating unit calculates a product of the mixed conditional probability of each word to obtain the sentence probability of an output sentence.

The output sentence selecting unit selects a maximum sentence probability calculated by the sentence probability calculating unit and outputs the output sentence corresponding to the maximum sentence probability.

It can be seen from the above that, according to the language modeling method and apparatus provided by the examples of the present disclosure, the user input is cached. The cached user input is relevant to user input history information and a user input scenario. Thus, the cached-based language model has a self-study function which makes the language model more intelligent. On the other hand, through learning each inputting habit of the user, the man-machine interaction software is capable of being suit for different user groups and application scenarios. For example, there are at least the following advantages.

1. The performance of the language model is improved. Chinese input requirements of different uses are met. A prediction accuracy ratio is increased. It is applicable for many fields such as voice recognizing, handwritten character recognizing, Chinese keyboard input method, optical character recognizing, etc. accuracy ratio of a relevant system is increased.

2. Based on the solution of the present disclosure, an information searching system can be established based on the language model to improve performance of the information searching system, e.g., accuracy ratio, recalling ratio, etc.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A text inputting method, comprising:
   obtaining a user input;
   generating a candidate sentence list according to the user input;
   for each candidate sentence in the candidate sentence list, respectively calculating a standard conditional probability of each word in the candidate sentence according to a universal language model;
   respectively calculating a cache conditional probability of each word in the candidate sentence according to a pre-configured modeling policy, the user input and a pre-cached user input;
   calculating a mixed conditional probability of each word according to the standard conditional probability and the cache conditional probability;
   obtaining an on-screen probability of the candidate sentence according to the mixed conditional probability;
   sorting candidate sentences in the candidate sentence list according to their on-screen probabilities;
   and outputting the sorted candidate sentence list;
   wherein:
   the cache conditional probability of each word in the candidate sentence is positively related to a time function value of the word, and the time function value is related to a time when the word enters a cache area used for the pre-cached user input;
   wherein the time function value is a result obtained by dividing a preconfigured constant by a time interval between an ith word enters the cache area and a word currently inputted by the user.

2. The text inputting method of claim 1, wherein:
   the pre-cached user input corresponds to a user identifier; and the user identifier is an account registered by a user in an inputting software, or an identification number assigned for the user, or an IP address or MAC address associated with a device used by the user.

3. The text inputting method of claim 1, wherein the pre-cached user input adopts a queue data structure, the value of the time interval of the i th word is a position of the i th word in the cache queue.

4. The text inputting method of claim 1, wherein:
   in the sorted candidate sentence list, a sentence with a largest on-screen probability is selected and outputted, and the sentence with the largest on-screen probability is cached in the pre-cached user input.

5. The text inputting method of claim 1, wherein the process of respectively calculating the standard conditional probability of each word in the candidate sentence according to the universal language model comprises: respectively calculating the standard conditional probability of each the candidate sentence according to a pre-created standard Ngram language model, including:
   obtaining a number of times $k'i$ that a word sequence which includes the i th word and a preconfigured constant number of words before the i th word emerges in training material of the standard N gram language model;
   obtaining a number of times $k'i-1$ that a word sequence which includes the preconfigured constant number of words before the ith word emerges in the training material of the standard Ngram language model;

calculating a ratio of k'i to k'i−1, and taking the ratio as the standard conditional probability of the ith word of the candidate sentence.

6. The text inputting method of claim 1, wherein calculating a cache conditional probability of an ith word in the candidate sentence comprises:
   obtaining a number of times ki; that a word sequence which includes the i th word and a predefined number of consecutive words before the i th word emerges in the pre-cached user input;
   obtaining a number of times ki−1 that a word sequence which includes the predefined number of words before the i th word emerges in the pre-cached user input;
   obtaining the time function value of the i th word; and
   calculating a ratio of ki to ki−1, multiplying the ratio with the time function value of the i th word to obtain the cache-based conditional probability of the i th word in the candidate sentence.

7. The text inputting method of claim 1, wherein calculating the mixed conditional probability of an ith word in the candidate sentence comprises:
   A1, determining an interpolation parameter which is between 0 and 1;
   A2, determining a product of the interpolation parameter and the standard conditional probability of the ith word;
   A3, calculating a product of a difference between 1 and the interpolation parameter and the cache conditional probability of the ith word; and
   A4, calculating a sum of the products obtained in A2 and A3 and taking the sum as the mixed conditional probability of the ith word.

8. A text inputting method comprising:
   obtaining a user input;
   generating a candidate sentence list according to the user input;
   for each candidate sentence in the candidate sentence list, respectively calculating a standard conditional probability of each word in the candidate sentence according to a universal language model;
   respectively calculating a cache conditional probability of each word in the candidate sentence according to a pre-configured modeling policy, the user input and a pre-cached user input;
   calculating a mixed conditional probability of each word according to the standard conditional probability and the cache conditional probability;
   obtaining an on-screen probability of the candidate sentence according to the mixed conditional probability;
   sorting candidate sentences in the candidate sentence list according to their on-screen probabilities;
   and outputting the sorted candidate sentence list;
   wherein:
      in the sorted candidate sentence list, a sentence with a largest on-screen probability is selected and outputted, and the sentence with the largest on-screen probability is cached;
      the process of respectively calculating a standard conditional probability of each word in the candidate sentence according to the universal language model comprises:
      respectively calculating the standard conditional probability of each word in the candidate sentence according to a pre-created standard Ngram language model, and calculating the cache conditional probability of an ith word in the candidate sentence comprises:
         obtaining a number of times ki that a word sequence which includes the ith word and a predefined constant number of words emerges before the ith word in cached training material;
         obtaining a number of times ki−1 that a word sequence which includes a predefined constant number of words emerges before the ith word in cached training material;
         obtaining a time function value of the ith word; and
         calculation a ratio of ki to ki−1, multiplying the ratio with the time function value of the ith word to obtain the cache conditional probability of the ith word in the user input.

9. The text inputting method of claim 8, wherein the time function value is a result obtained by dividing a preconfigured constant by a time interval between the ith word enters the cache area and a word currently inputted by the user.

10. The text inputting method of claim 8, Wherein calculating a standard conditional probability of an ith word in the candidate sentence comprises:
   obtaining a number of times k'; that a word sequence which includes the i th word and a preconfigured constant number of words before the i th word emerges in training material of the standard N gram language model;
   obtaining a number of times k'i−1 that a word sequence which includes the preconfigured constant number of words before the ith word emerges in the training material of the standard N gram language model;
   calculating a ratio of k'i to k'i−1, and taking the ratio as the standard conditional probability of the ith word of the candidate sentence.

11. The text inputting method of claim 8, wherein calculating the mixed conditional probability of an ith word in the candidate sentence comprises:
   A1, determining an interpolation parameter which is between 0 and 1;
   A2, determining a product of the interpolation parameter and the standard conditional probability of the ith word;
   A3, calculating a product of a difference between 1 and the interpolation parameter and the cache conditional probability of the ith word; and
   A4, calculating a sum of the products obtained in A2 and A3 and taking the sum as the mixed conditional probability of the ith word.

12. The text inputting method of claim 9, wherein the pre-cached user input adopts a queue data structure, the value of the time interval of the i th word is a position of the i th word in the cache queue.

13. The text inputting method of claim 8, wherein if the precached user input is null, the cache conditional probability of each word in the candidate sentence equals to the standard conditional probability of the word.

14. A text processing apparatus, comprising:
   one or more processors;
   memory; and
   one or more program modules stored in the memory and to be executed by the one or more processors, the one or more program modules including:
   a universal language model module, a cache module, a cache-based language modeling module and a mixed model module; wherein the universal language model module is to receive a user input, generate a candidate sentence list according to the user input, calculate a standard conditional probability of each word in the each candidate sentence respectively and output the standard conditional probability to the mixed model module;

the cache module is to cache a sentence outputted by the mixed model module;

the cache-based language modeling module is to respectively calculate a cache conditional probability of each word in each candidate sentence according to a preconfigured cache-based language modeling policy, the user input and the sentences cached in the cache module, and output the cache conditional probability to the mixed model module;

the mixed model module is to calculate a mixed conditional probability of each word according to the standard conditional probability and the cache conditional probability, calculate a sentence probability of each candidate sentence according to the mixed conditional probability, and select and output the sentence with the largest sentence probability; and the cache-based language modeling module is further configured to calculate a time function value of each word, wherein the cache-based conditional probability of each word is positively related to the time function value of the word, and the time function value is related to a time when the word enters the cache module;

wherein the time function value is a result obtained by dividing a preconfigured constant by a time interval between an ith word enters the cache area and a word currently inputted by the user.

15. The text processing apparatus of claim 14, wherein the universal language model is a standard Ngram language model module, the standard Ngram language model module comprising: a first word sequence frequency counting unit, a second word sequence frequency counting unit and a standard conditional probability calculating unit;

the first word sequence frequency counting unit is to obtain a number of times $k'i$ that a word sequence which includes an ith word and a predefined constant number of words before the ith word emerges in the training material of the standard Ngram language model, and output $k'i$ to the standard conditional probability calculating unit;

the second word sequence frequency counting unit is to obtain a number of times $k'i-1$ that a word sequence which includes the predefined constant number of words before the ith word emerges in the training material of the standard Ngram language model, and output $k'i-1$ to the standard conditional probability calculating unit; and the standard probability calculating unit is to calculate a ratio of $k'i$ to $k'i-1$, and take the ratio as the standard conditional probability of the ith word in the candidate sentence.

16. The text processing apparatus of claim 15, the cache-based language modeling module comprises: a third word sequence frequency counting unit, a fourth word sequence frequency counting unit, a time function value obtaining unit and a cache conditional probability calculating unit;

the third word sequence frequency counting unit is to obtain a number of times $ki$ that a word sequence which includes the ith word and the predefined constant number of words before the ith word emerges in cached training material from the cache module, and output $ki$ to the cache conditional probability calculating unit;

the fourth word sequence frequency counting unit is to obtain a number of times $ki-1$ that a word sequence which includes the predefined constant number of words before the ith word emerges in the cached training material, and output $ki-1$ to the cache conditional probability calculating unit;

the time function value obtaining unit is to obtain a time function value of the ith word and output the value to the cache conditional probability calculating unit; and the cache conditional probability calculating unit is to calculate a ratio of $ki$ to $ki-1$, multiply the ratio with the time function value of the ith word to obtain the cache conditional probability of the ith word in the candidate sentence.

17. The text processing apparatus of claim 16, wherein the mixed model module includes: an interpolation parameter storage unit, a first multiplying unit, a second multiplying unit, a mixed conditional probability calculating unit, a sentence probability calculating unit and an output sentence selecting unit;

the interpolation parameter storage unit is to store an interpolation parameter whose value is configured between 0 and 1 in advance;

the first multiplying unit is to calculate a product of the interpolation parameter stored in the interpolation parameter storage unit and the standard conditional probability of the ith word in the candidate sentence and output the product to the mixed conditional probability calculating unit;

the second multiplying unit is to calculate a difference between 1 and the interpolation parameter and calculate a product of the difference and the cache conditional probability of the ith word, and output the product to the mixed conditional probability calculating unit;

the mixed conditional probability calculating unit is to add the products related to the ith word and take the sum as the mixed conditional probability of the ith word;

the sentence probability calculating unit is to calculate a product of the mixed conditional probability of each word to obtain the sentence probability of the candidate sentence;

the output sentence selecting unit is to select and output the sentence with the largest sentence probability calculated by the sentence probability calculating unit.

18. The text processing apparatus of claim 14, wherein the cache module adopts a queue data structure, the value of the time interval of the ith word is a position of the ith word in the cache queue.

* * * * *